(12) United States Patent
Hakoda et al.

(10) Patent No.: US 11,673,306 B2
(45) Date of Patent: Jun. 13, 2023

(54) INJECTION MOLDING MACHINE AND FLASH PREVENTION METHOD

(71) Applicant: NISSEI PLASTIC INDUSTRIAL CO., LTD., Nagano (JP)

(72) Inventors: Takashi Hakoda, Nagano (JP); Mitsuhiro Ogasawara, Nagano (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 0 days.

(21) Appl. No.: 17/735,709

(22) Filed: May 3, 2022

(65) Prior Publication Data

US 2022/0281148 A1 Sep. 8, 2022

Related U.S. Application Data

(62) Division of application No. 16/941,317, filed on Jul. 28, 2020, now Pat. No. 11,407,157.

(30) Foreign Application Priority Data

Sep. 20, 2019 (JP) ................................. 2019-171424

(51) Int. Cl.
*B29C 45/76* (2006.01)
*B29C 45/77* (2006.01)

(52) U.S. Cl.
CPC ........ *B29C 45/768* (2013.01); *B29C 45/7613* (2013.01); *B29C 45/77* (2013.01);
(Continued)

(58) Field of Classification Search
CPC .......................... B29C 45/768; B29C 45/7613
See application file for complete search history.

(56) References Cited

U.S. PATENT DOCUMENTS

| 3,792,134 A | * | 2/1974 | Paulson | .................. B29C 45/77 264/40.7 |
| 7,981,333 B2 | | 7/2011 | Kudo et al. | |
| 2001/0030375 A1 | * | 10/2001 | Kamiguchi | ........... B29C 45/768 425/149 |
| 2010/0109183 A1 | * | 5/2010 | Kudo | .................. B29C 45/7653 264/40.5 |

(Continued)

FOREIGN PATENT DOCUMENTS

| EP | 0 569 019 A1 | 11/1993 |
| JP | 60-161126 A | 8/1985 |

(Continued)

OTHER PUBLICATIONS

Extended European Search Report issued in corresponding European Patent Application No. 20190374.7-1014, dated Feb. 3, 2021.
(Continued)

*Primary Examiner* — Matthew J Daniels
*Assistant Examiner* — Gregory C. Grosso
(74) *Attorney, Agent, or Firm* — McDermott Will & Emery LLP

(57) ABSTRACT

When an injection molding machine performs molding, the mold clamping force on the mold is adjusted on the basis of a mold displacement of the mold or the injection peak pressure and injection foremost position so that the molding is performed without causing flash and by an appropriate mold clamping force with which energy can be reduced. The amount of mold displacement and also the injection peak pressure and the injection foremost position are monitored during automatic operation. If there occurs no mold displacement change exceeding a threshold or if there occurs no injection peak pressure anomaly or injection foremost position anomaly exceeding thresholds, the automatic operation is continued. If the mold displacement change occurs or if the injection peak pressure anomaly and the injection foremost position anomaly occur, the operation of the injection molding machine is stopped.

3 Claims, 5 Drawing Sheets

(52) U.S. Cl.
CPC ............... *B29C 2945/76006* (2013.01); *B29C 2945/76163* (2013.01); *B29C 2945/76287* (2013.01); *B29C 2945/76381* (2013.01); *B29C 2945/76919* (2013.01)

(56) References Cited

U.S. PATENT DOCUMENTS

2012/0146260 A1  6/2012  Murata et al.
2017/0282423 A1  10/2017  Murata

FOREIGN PATENT DOCUMENTS

| | | |
|---|---|---|
| JP | 61-237614 A | 10/1986 |
| JP | S63-082725 A | 4/1988 |
| JP | H01-113881 A | 5/1989 |
| JP | H05-345342 A | 12/1993 |
| JP | 06-312444 A | 11/1994 |
| JP | 2000-355034 A | 12/2000 |
| JP | 2004-160682 A | 6/2004 |
| JP | 4805994 B2 | 11/2011 |
| JP | 2012-035417 A | 2/2012 |
| JP | 5000213 B2 | 8/2012 |
| JP | 5180357 B1 | 4/2013 |

OTHER PUBLICATIONS

Japanese Office Action issued in corresponding Japanese Patent Application No. 2019-171424, dated Jun. 29, 2021, with English translation.

\* cited by examiner

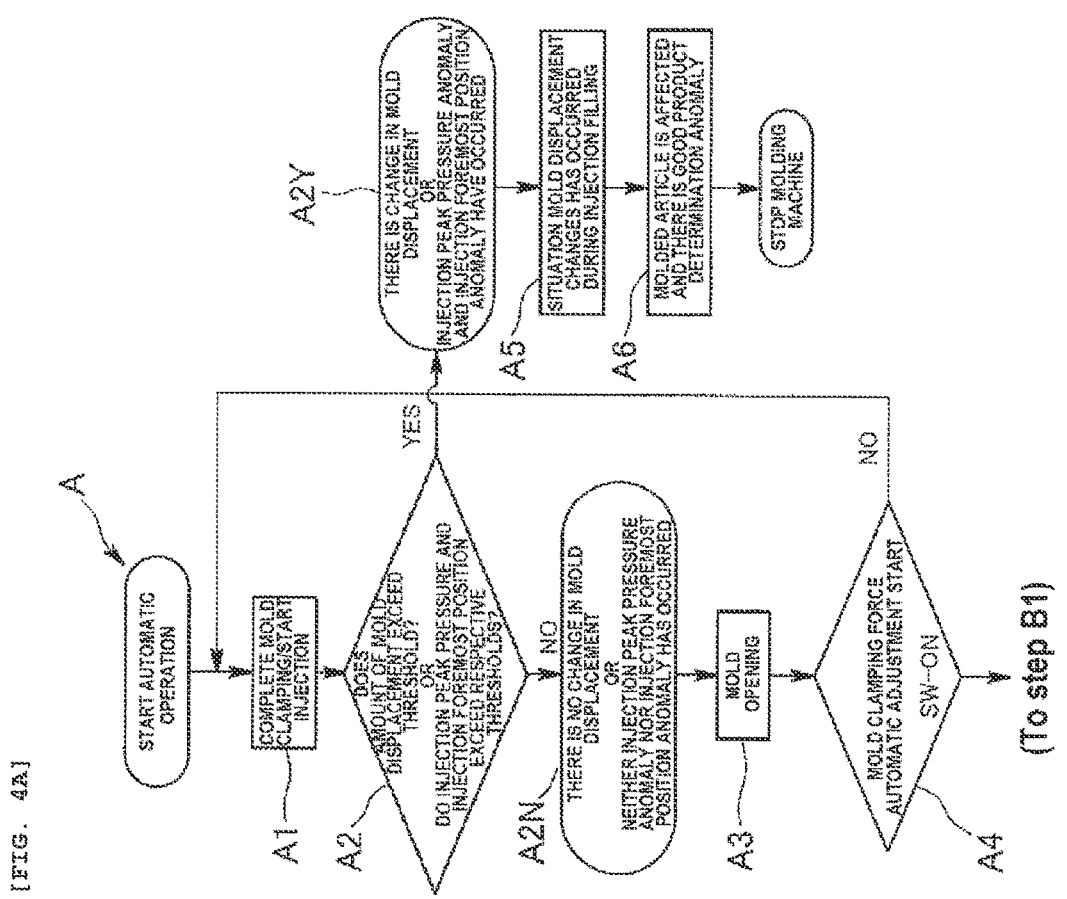
[FIG. 4A]

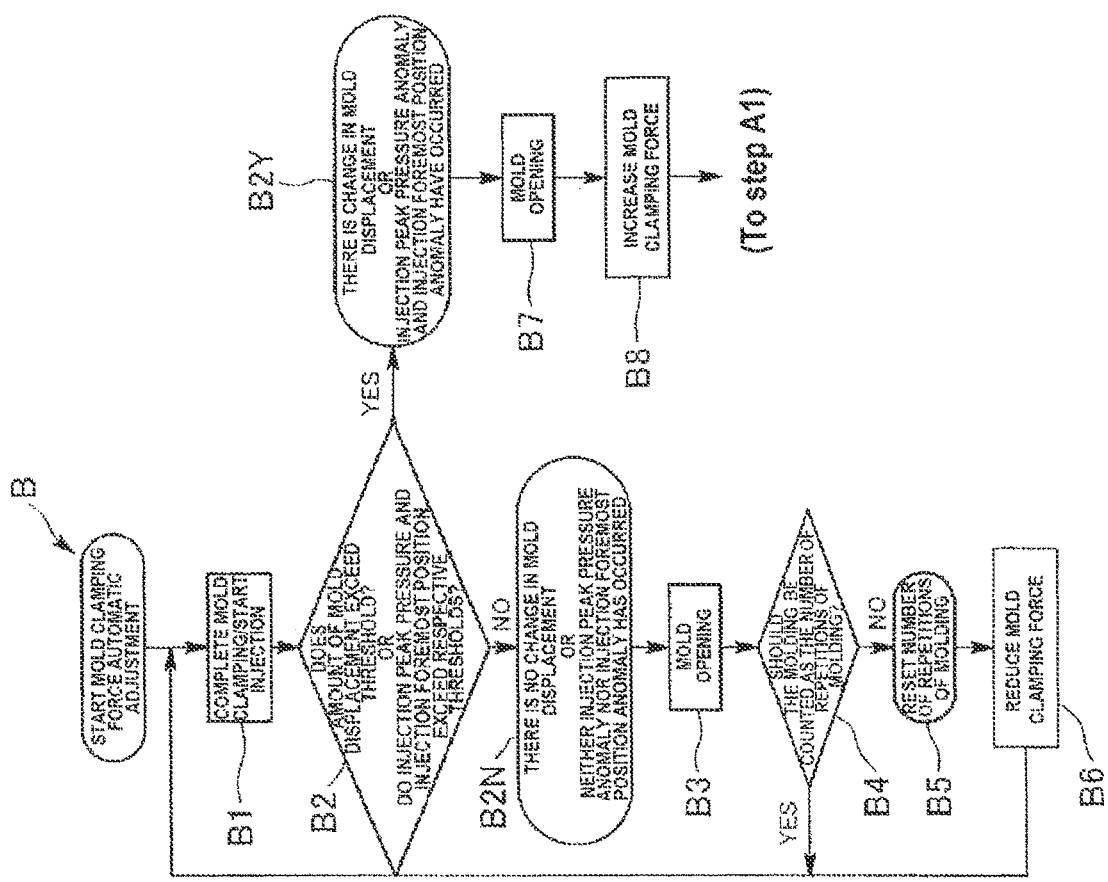

INJECTION MOLDING MACHINE AND FLASH PREVENTION METHOD

CROSS-REFERENCE OF RELATED APPLICATIONS

This application is a Divisional of U.S. patent application Ser. No. 16/941,317 filed on Jul. 28, 2020, which claims the benefit of Japanese Patent Application No. 2019-171424, filed on Sep. 20, 2019, the entire disclosure of which Application is incorporated by reference herein.

BACKGROUND OF THE INVENTION

1. Field of the Invention

The present invention relates to an injection molding machine and a flash prevention method.

2. Description of the Related Art

There has conventionally been an injection molding machine including a mold clamping unit and an injection unit. The mold clamping unit includes tie bars located across a stationary platen fixed onto a base and a pressure-receiving platen movable over the base. The tie bars are fixed to and supported by the stationary platen at one end each. The pressure-receiving platen is coupled to the other ends of the tie bars in a manner so that its position can be adjusted with respect to the tie bars. The movable platen is attached between the stationary platen and the pressure-receiving platen movably along the tie bars. A toggle mechanism is built in between the pressure-receiving platen and the movable platen. A mold located between the movable platen and the stationary platen is closed and a mold clamping force is further applied to perform mold clamping by extension of the toggle mechanism.

The injection unit performs injection filling of a molten resin at the timing when the mold is clamped. The injection molding machine including the mold clamping unit and the injection unit has a molding cycle including mold closing, mold clamping, injection filling, measurement, mold opening, and removal of a molded article. The injection molding machine repeats the molding cycle to successively mold molded articles.

When the injection molding machine performs molding, a molded article can be molded without flash by clamping the mold with the maximum mold clamping force of the mold clamping unit. However, the repeated application of an excessive mold clamping force to the mold accelerates degradation of the mold. The application of the excessive mold clamping force also causes an unnecessary increase in energy use. Early degradation of the mold can thus be suppressed and the energy used to obtain a mold clamping force can be reduced if mold clamping can be performed by a minimum appropriate mold clamping force.

Methods for setting an appropriate mold clamping force in performing molding in the foregoing injection molding machine have heretofore been proposed. For example, a method described in Patent Literature 1 uses a mold clamping force sensor comprising a tie bar sensor attached to a tie bar. Molding is performed by gradually reducing a set mold clamping force each time a molding cycle is completed, starting at the maximum value thereof the mold clamping unit can apply. During injection filling, a change in the mold clamping force applied to the mold is detected from the distortion of the tie bar, and the set mold clamping force is adjusted to an appropriate value on the basis of the detected change.

Patent Literature 2 describes a method in which injection molding is performed under arbitrary set mold clamping forces of different magnitudes. The mold clamping force when the mold is closed and the maximum value of the mold clamping force to occur during injection while a molten resin is injected into the mold are detected, whereby the mold clamping force at each point in time is obtained in advance. A maximum amount of mold clamping force increase that is a difference between the mold clamping force when the mold is closed and the maximum value of the mold clamping force during injection is then calculated. Two or more set mold clamping forces are extracted from a section where the respective maximum amounts of mold clamping force increase are different and the mold remains closed. A formula representing the maximum amount of mold clamping force increase with respect to the set mold clamping force is further determined from the combination of the two or more set mold clamping forces extracted and the maximum amounts of mold clamping force increase. Injection is performed by a set mold clamping force smaller than the two or more set mold clamping forces extracted, and the maximum amount of mold clamping force increase in a section where the set mold clamping force is smaller than the two or more set mold clamping forces extracted is calculated. A set mold clamping force at which the calculated maximum amount of mold clamping force increase exceeds a comparative value based on the foregoing formula is then determined by calculation. The method sets a mold clamping force immediately before the determined set mold clamping force as the minimum necessary mold clamping force to maintain the mold closed.

Patent Literature 3 describes a method in which molding is tried with set mold clamping forces successively reduced from a maximum mold clamping force in units of predetermined amounts. A mold position of a movable platen with respect to a stationary platen in the injection step is detected by using a mold position sensor. The set mold clamping force at which a change occurs in the mold position is increased by a predetermined amount, and the resulting mold clamping force is set as an appropriate mold clamping force. In addition, a lower limit value in successively reducing the set mold clamping force from the maximum mold clamping force is set. If the set mold clamping force reaches the limit value without a change in the mold position, the method sets the limit value as the appropriate mold clamping force.

CITATION LIST

Patent Literature

Patent Literature 1: Japanese Patent No. 5000213
Patent Literature 2: Japanese Patent No. 5180357
Patent Literature 3: Japanese Patent No. 4805994

As described above, according to the foregoing Patent Literature 1, molding is performed with the set mold clamping force gradually reduced. The mold clamping force is detected from the tie bar sensor each time molding is performed. The method described in Patent Literature 2 includes detecting the mold clamping force from the tie bar sensor, for example, in measuring the maximum amount of mold clamping force increase in a section where the distortion of the mold is released. The method described in Patent Literature 3 includes detecting relative positions of the stationary platen and the movable platen with the mold position sensor attached across the stationary platen and the movable platen.

In the process of reducing the set mold clamping force stepwise and performing injection each time, the injection pressure of the molten resin eventually exceeds the mold clamping force. The fixed mold and the movable mold are thereby pushed open to form a gap at the parting line (between the contact surfaces where the fixed mold and the movable mold are in contact with each other) with an increase in the cavity size (the size of the space to be filled). If the injection unit injects and fills the molten resin into the mold with the increased cavity size, there occurs a phenomenon that the injection peak pressure drops.

Moreover, since the increased cavity is filled with more molten resin than the set amount of filling, there occurs a phenomenon that the injection foremost position of the screw of the injection unit shifts forward (to the mold clamping unit side) compared to a predetermined position.

As described above, if the set mold clamping force is reduced stepwise and injection filling is performed on the mold, there can occur an anomaly that the injection peak pressure drops and an anomaly that the injection foremost position of the screw shifts forward from the predetermined position. Such a situation is likely to cause flash on the molded article. In view of adjusting the set mold clamping force to an appropriate mold clamping force to prevent flashing, it is therefore also effective to detect whether the injection peak pressure and the injection foremost position are normal in the process of gradually reducing the set mold clamping force. Such considerations are neither disclosed nor suggested in any of Patent Literature 1 to 3.

SUMMARY OF THE INVENTION

An object of the present invention is to adjust, when an injection molding machine clamps a mold and performs molding, the mold clamping force on the mold on the basis of a mold displacement of the mold detected by using a mold gap detection sensor or the injection peak pressure and injection foremost position of an injection unit so that the molding is performed without causing flash and by an appropriate mold clamping force with which energy needed for mold clamping can be reduced.

According to one aspect of the present invention, an injection molding machine includes a mold clamping unit and an injection unit, the mold clamping unit including a movable platen attached movably along a tie bar located across a stationary platen and a pressure-receiving platen, the injection molding machine capable of performing automatic operation of repeating a molding cycle by the mold clamping unit closing a mold including a movable mold attached to the movable platen and a fixed mold attached to the stationary platen and applying a mold clamping force to perform mold clamping by extension of a toggle mechanism located between the pressure-receiving platen and the movable platen and the injection unit performing injection filling of a molten resin into the clamped mold. Here, the injection molding machine further includes a mold gap detection sensor configured to detect mold displacement of the mold, the mold displacement referring to a change occurring in a gap between contact surfaces of the movable mold and the fixed mold along with a change in a length of the tie bar during the injection filling, an injection pressure sensor configured to detect an injection peak pressure, a screw position sensor configured to detect an injection foremost position of a screw of the injection unit, and a control unit configured to be connected with the mold gap detection sensor, the injection pressure sensor, and the screw position sensor. In this injection molding machine, an allowable amount where no flash occurs is set as a threshold for an amount of mold displacement of the mold, and allowable amounts where no flash occurs are set as thresholds for the injection peak pressure and the injection foremost position. The control unit, if there occurs no such mold displacement change that the amount of mold displacement during the injection filling exceeds its threshold or if there occurs no such injection peak pressure anomaly or injection foremost position anomaly that the injection peak pressure or the injection foremost position during the filling injection exceeds its threshold, continues the automatic operation to repeat the molding cycle, and if the mold displacement change occurs or if the injection peak pressure anomaly and the injection foremost position anomaly occur, stops operation of the injection molding machine. As a result, the foregoing object can be achieved.

In the foregoing invention, the mold gap detection sensor may preferably be attached to either one of an end of the tie bar protruding behind the pressure-receiving platen and an immovable portion of a base. A sensing plate opposed to the mold gap detection sensor via a gap may preferably be attached to the other thereof. The mold gap detection sensor and the sensing plate may preferably be arranged in a positional relationship of being opposed in a direction of moving away from each other when the tie bar extends. The mold gap detection sensor may preferably detect a change in distance between the mold gap detection sensor and the sensing plate.

In the foregoing invention, the control unit may preferably perform control on mold clamping force automatic adjustment. The control on the mold clamping force automatic adjustment may preferably include: if a molding cycle where the molding displacement change does not occur or where the injection peak pressure anomaly and the injection foremost position anomaly do not occur is performed a preset number of times in succession, reducing the mold clamping force by a preset amount of reduction and proceeding to a next molding cycle; and if the mold displacement change occurs or the injection peak pressure anomaly and the injection foremost position anomaly occur, increasing the mold clamping force by a preset amount of increase and proceeding to a next molding cycle.

In the foregoing invention, if the mold displacement change occurs or the injection peak pressure anomaly and the injection foremost position anomaly occur in the next molding cycle after the mold clamping force is increased by the preset amount of increase, the control unit may preferably stop the operation of the injection molding machine.

In the foregoing invention, the injection molding machine may preferably include a display configured to display a waveform of a detection value of the mold gap detection sensor.

In the foregoing invention, if the amount of mold displacement reaches a preset mold displacement amount maximum value, the control unit may preferably stop the operation of the injection molding machine.

According to another aspect of the present invention, a flash prevention method of an injection molding machine configured to close a mold and apply a mold clamping force thereto to perform mold clamping by a mold clamping unit and perform injection filling of a molten resin into the mold by an injection unit includes: presetting an allowable amount where no flash occurs as a threshold for an amount of mold displacement of the mold, and presetting allowable amounts where no flash occurs as thresholds for an injection peak pressure and an injection foremost position; monitoring the amount of mold displacement and monitoring the injection peak pressure and the injection foremost position during automatic operation of repeating a molding cycle; and if a mold displacement change occurs or an injection peak pressure anomaly and an injection foremost position anomaly occur, stopping operation of the injection molding machine. As a result, the foregoing object can be achieved.

The foregoing invention may preferably comprise a mold clamping force automatic adjustment step, the mold clamping force automatic adjustment step including: if a molding cycle where the mold displacement change does not occur or the injection peak pressure anomaly and the injection foremost position anomaly do not occur is performed a preset number of times in succession, reducing the mold clamping force by a preset amount of reduction and proceeding to a next molding cycle; and if the mold displacement change occurs or the injection peak pressure anomaly and the injection foremost position anomaly occur, increasing the mold clamping force by a preset amount of increase and proceeding to a next molding cycle.

In the foregoing invention, if the mold displacement change occurs or the injection peak pressure anomaly and the injection foremost position anomaly occur in the next molding cycle after the mold clamping force is increased by the preset amount of increase in the mold clamping force automatic adjustment step, the operation of the injection molding machine may preferably be stopped.

According to the present invention, flash-free molded articles can be manufactured without applying an excessive mold clamping force or injection pressure to the mold. The smaller load on the injection molding machine and the mold can increase the life of the injection molding machine and the mold, and contribute to power saving as well.

BRIEF DESCRIPTION OF THE DRAWINGS

FIG. 4A is a flowchart showing a control flow of automatic operation of the injection molding machine.

FIG. 4B is a flowchart showing mold clamping force automatic adjustment of the injection molding machine.

DETAILED DESCRIPTION OF THE INVENTION

Figure 1:
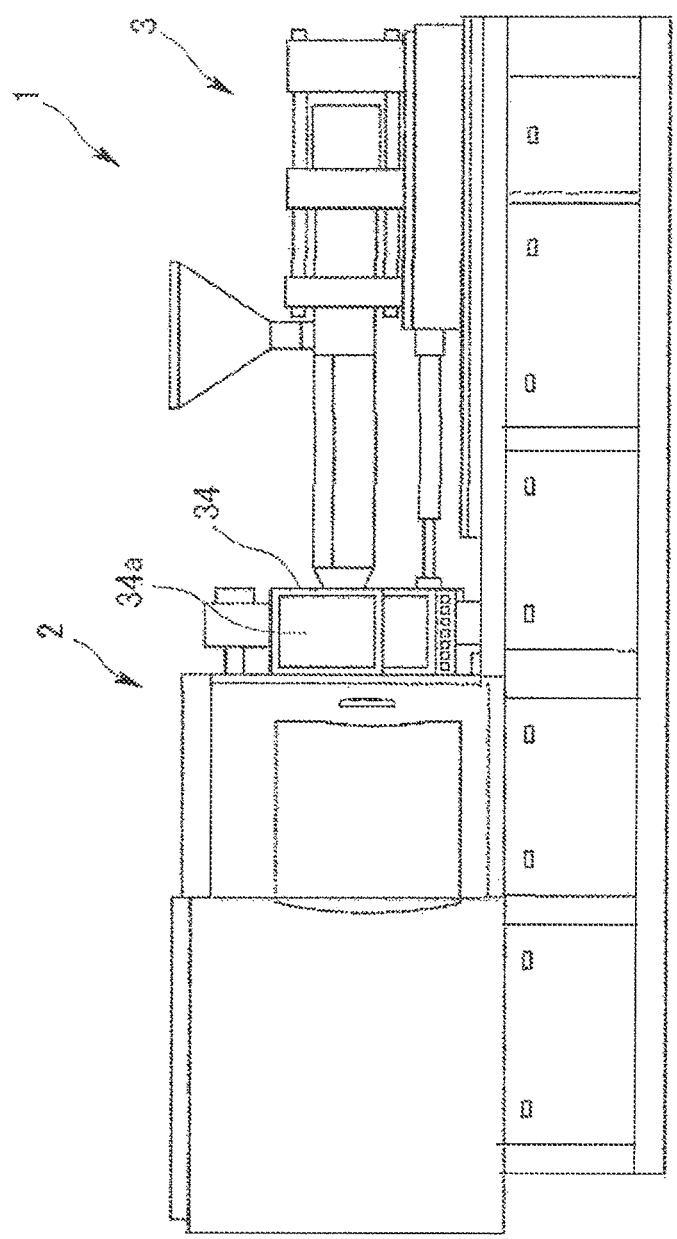
FIG. 1 is an explanatory diagram showing an example of an injection molding machine according to the present invention.
Figure 2:
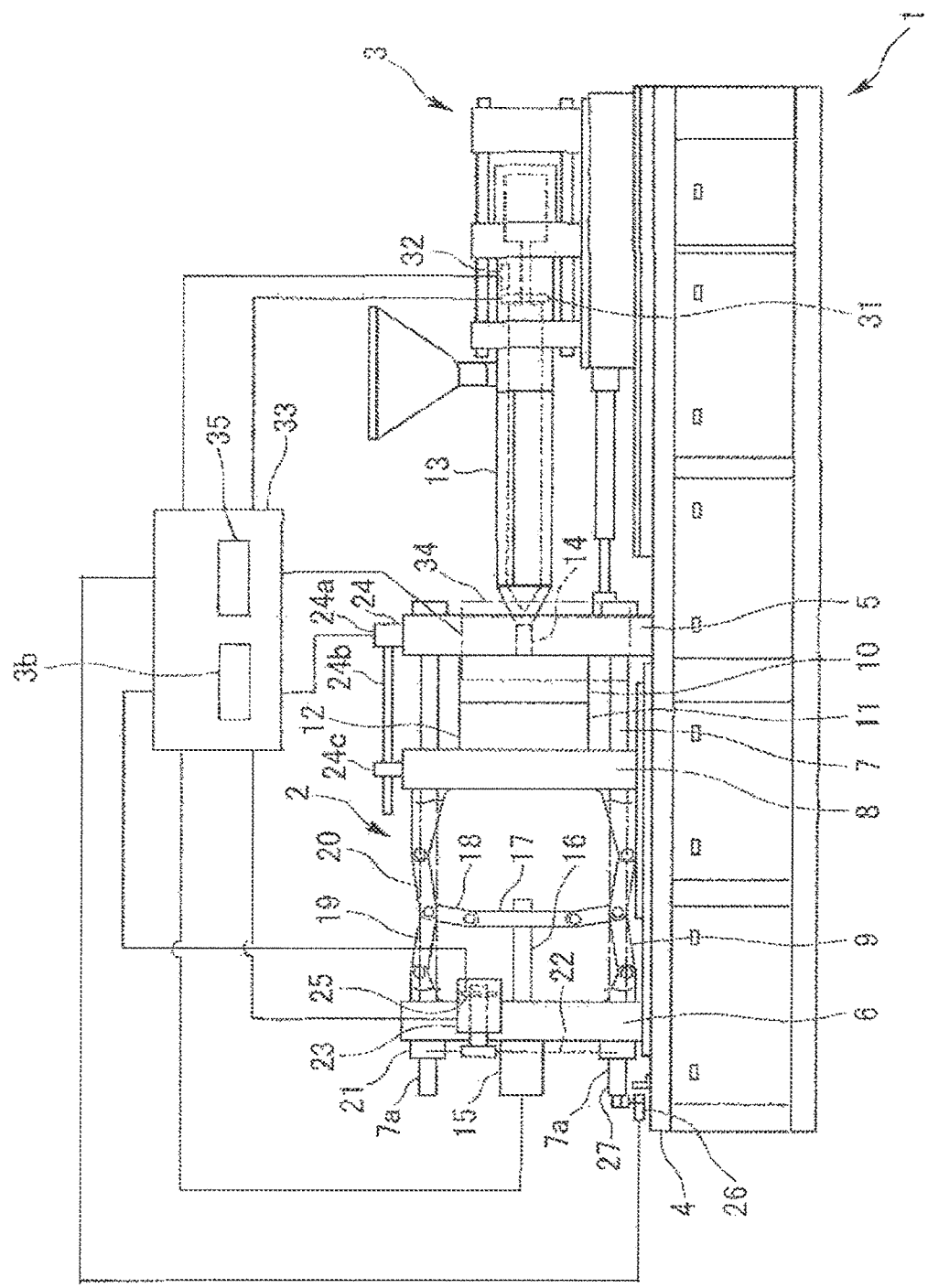
FIG. 2 is an explanatory diagram showing an example of the injection molding machine with a mold clamping unit cover removed.

The present invention will be described in detail on the basis of an embodiment shown in FIGS. 1 to 4. FIGS. 1 and 2 show an injection molding machine 1 that is the embodiment of the present invention. The injection molding machine 1 includes a toggle type mold clamping unit 2 and an injection unit 3. A molding cycle includes mold closing, mold clamping, injection filling of a molten resin, measurement, mold opening, and removal of a molded article. The injection molding machine 1 can perform automatic operation of repeating the molding cycle to manufacture molded articles.

(Mold Clamping Unit)

The toggle type mold clamping unit 2 includes a stationary platen 5, a pressure-receiving platen 6, tie bars 7, and a movable platen 8. The stationary platen 5 is fixed onto a base 4. The pressure-receiving platen 6 is installed movably over the base 4. The tie bars 7 are located across the stationary platen 5 and the pressure-receiving platen 6. The tie bars 7 are fixed to the stationary platen 5 at one end each. The other ends of the tie bars 7 are passed through and coupled to the pressure-receiving platen 6 in a position adjustable manner. The movable platen 8 is attached movably along the tie bars 7. A toggle mechanism 9 is built in between the pressure-receiving platen 6 and the movable platen 8. The movable platen 8 is moved in the longitudinal direction of the tie bars 7 by extension and contraction of the toggle mechanism 9.

(Injection Unit)

The injection unit 3 is an apparatus for injecting and filling a molten resin into a mold 12. The mold 12 is composed of a fixed mold 10 installed on the stationary platen 5 and a movable mold 11 installed on the movable platen 8. An injection nozzle 14 at the end of a heating cylinder 13 surrounded by a heater is brought into contact with the mold 12.

(Toggle Mechanism)

The toggle mechanism 9 includes a drive shaft 16, a crosshead 17, toggle levers 18, toggle levers 19, and toggle arms 20. The drive shaft 16 is driven to axially rotate by a mold clamping motor 15. The crosshead 17 is threadedly engaged with the drive shaft 16. The toggle levers 18 are pivotally supported by the crosshead 17. The toggle levers 19 are pivotally supported by the pressure-receiving platen 6. The toggle arms 20 are pivotally supported by the movable platen 8. The toggle levers 18 and 19 are link-connected with each other, and so are the toggle levers 19 and the toggle arms 20. The axial rotation of the drive shaft 16 moves the crosshead 17 forward and backward to move the movable platen 8, whereby the mold 12 is closed and opened. A mold clamping force is also applied to the mold 12 by this action.

(Pressure-Receiving Platen)

The tie bars 7 are passed through the pressure-receiving platen 6 so that the ends of the tie bars 7 protrude behind the pressure-receiving platen 6 (on the opposite side from the movable platen 8). Threaded portions 7a are formed on the protruding ends of the respective tie bars 7. Nut members 21 to be threadedly engaged with the threaded portions 7a are rotatably attached to the pressure-receiving platen 6. The tie bars 7 are thus coupled to the pressure-receiving platen 6 via the nut members 21 threadedly engaged with the threaded portions 7a at the ends of the tie bars 7. As will be described later, the position of the pressure-receiving platen 6 with respect to the tie bars 7 can be adjusted by rotating the nut members 21.

The nut members 21 rotate in a synchronous manner via a drive transmission mechanism 22 behind the pressure-receiving platen 6. The mold clamping unit 2 further includes a mold thickness motor 23 serving as a driving source for adjusting a mold clamping position. The driving force from the mold thickness motor 23 is transmitted as a rotational force to the nut members 21 via the drive transmission mechanism 22. The rotation of the nut members 21 moves the pressure-receiving platen 6 in the longitudinal direction of the tie bars 7, and further moves the toggle mechanism 9 and the movable platen 8 together. To generate a desired mold clamping force, the mold thickness motor 23 is operated to position the pressure-receiving platen 6. With the pressure-receiving platen 6 positioned, the toggle mechanism 9 is extended to generate a set mold clamping force (desired mold clamping force).

(Mold Position Sensor and Mold Thickness Sensor)

A mold position sensor 24 is attached across the stationary platen 5 and the movable platen 8. As shown in FIG. 2, the mold position sensor 24 includes a sensor main body 24a, a rod 24b, and a detection member 24c. The sensor main body 24a is fixed to the top of the stationary platen 5. The rod 24b is extended from the sensor main body 24a to above the movable platen 8. The rod 24b is movably passed through the detection member 24c fixed to the top of the movable platen 8, whereby the position of the rod 24b passed through the detection member 24c is measured. The mold position sensor 24 is attached across the stationary platen 5 and the movable platen 8 to measure the distance between the stationary platen 5 and the movable platen 8 in a linear fashion (linear displacement measurement). A control unit to be described later controls the operation of the mold clamping motor 15 on the basis of a detection value detected by the mold position sensor 24, where by the position of the movable mold 11 during mold opening and closing is set.

A mold thickness sensor 25 is attached to the rotation shaft of the mold thickness motor 23. The control unit to be described later controls the operation of the mold thickness motor 23 to set the mold clamping force on the basis of a detection value detected by the mold thickness sensor 25.

(Mold Gap Detection Sensor)

Figure 3:
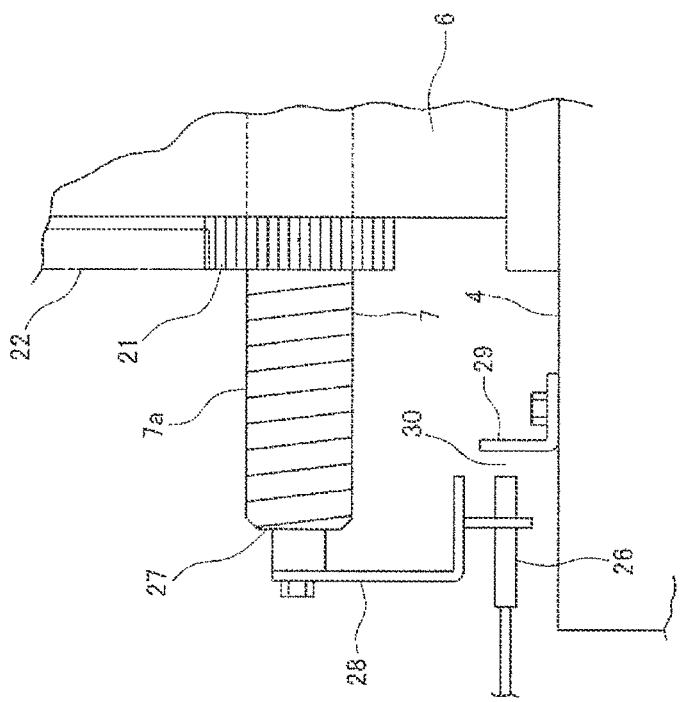
FIG. 3 is an explanatory diagram showing an attached state of an example of a mold gap detection sensor.

The injection molding machine 1 according to the present embodiment further includes a mold gap detection sensor 26 located behind the pressure-receiving platen 6. As shown in FIG. 3, the end of the lower one of the tie bars 7 protrudes behind the pressure-receiving platen 6. A sensor holder 28 is attached to an end face 27 at the end of the tie bar 7 to hang down, and the mold gap detection sensor 26 is attached to the lower part of the sensor holder 28.

The mold gap detection sensor 26 is located at a position corresponding to a sensing plate 29 fixed upright to an immovable portion of the base 4. The mold gap detection sensor 26 is opposed to the sensing plate 29 in the longitudinal direction of the tie bars 7, and detects, in a direct sense, a change in the distance between the mold gap detection sensor 26 and the sensing plate 29. The mold gap detection sensor 26 is located on the other side of the sensing plate 29 from the stationary platen 5 in such a positional relationship that a gap 30 between the mold gap detection sensor 26 and the sensing plate 29 increases if the tie bar 7 is elongated. As will be described later, if the mold 12 causes a mold displacement (a change in the gap between the mutual contact surfaces of the fixed mold 10 and the movable mold 11) during injection filling, the tie bars 7 are elongated. The extension and contraction of the tie bars 7, including such elongation of the tie bars 7, correspond to the change in the distance. In this sense, the mold gap detection sensor 26 is a sensor for detecting a mold displacement. Note that even if the tie bars 7 make a maximum contraction, the gap 30 is left between the mold gap detection sensor 26 and the sensing plate 29 so that the mold gap detection sensor 26 will not be in contact with the sensing plate 29.

The mold gap detection sensor 26 detects, in a direct sense, a change in the distance to the sensing plate 29 that is fixed to the immovable portion of the base 4. Suppose now that the mold clamping force set in the injection molding machine 1 is applied to the mold 12 for mold clamping and then the injection filling pressure of the molten resin exceeds the mold clamping force. In such a case, the movable mold 11 and the movable platen 8 are pushed in a direction of opening the mold 12. This force acts as a force in a direction of pushing the pressure-receiving platen 6 including the toggle mechanism 9 backward, and eventually as a force in a direction of elongating the tie bars 7 coupled to the pressure-receiving platen 6 via the nut members 21.

If the tie bars 7 change in length due to the force in the direction of elongating the tie bars 7, the change is detected as a change in the distance between the mold gap detection sensor 26 and the sensing plate 29. If the mold 12 makes the foregoing mold displacement due to the injection filling pressure after mold clamping, the amount of mold displacement thus corresponds to the distance to the sensing plate 29 detected by the mold gap detection sensor 26. The mold gap detection sensor 26 is thus located to detect such variations in the amount of mold displacement.

In the foregoing embodiment shown in the drawings, the sensing plate 29 is attached to the base 4, and the mold gap detection sensor 26 is attached to the end of the lower tie bar 7. However, in the present invention, the positional relationship between the mold gap detection sensor 26 and the sensing plate 29 is not limited to such an arrangement. The arrangement may be reversed. Specifically, the mold gap detection sensor 26 may be attached to an immovable portion of the base 4, and the sensing plate 29 may be attached to the end of the lower tie bar 7 so that the sensing plate 29 is opposed to the mold gap detection sensor 26.

The mold gap detection sensor 26 is not limited to one opposed to the sensing plate 29 in use. Suppose that the injection filling pressure of the molten resin exceeds the mold clamping force and the tie bars 7 change in length due to the force in the direction of elongating the tie bars 7 as described above. In such a case, the tie bars 7 themselves are distorted. Changes in the distortion correspond to the extension and contraction of the tie bars 7. The mold displacement of the mold 12 corresponding to the extension and contraction of the tie bars 7 can thus be detected by detecting the distortion of the tie bars 7.

As another example of the foregoing embodiment, a mold gap detection sensor 26 configured to detect the mold displacement of the mold 12 on the basis of the distortion of a tie bar 7 may therefore be located at a portion of at least either one of the tie bars 7 where distortion occurs during injection filling. For example, as the mold gap detection sensor 26, a sensor for detecting the distortion of a tie bar 7 may be attached, by using a mounting member, to any of the following positions: a portion of the tie bar 7 between the stationary platen 5 and the movable platen 8 where the sensor will not collide with other members such as the movable platen 8; and a portion of the tie bar 7 between the pressure-receiving platen 6 and the movable platen 8 where the sensor will not collide with other members such as the movable platen 8 and the pressure-receiving platen 6. A sensor that directly detects the size of the gap between the contact surfaces where the fixed mold 10 and the movable mold 11 are in contact with each other during injection filling may be used as the mold gap detection sensor 26.

(Injection Pressure Sensor)

The injection unit 3 includes an injection pressure sensor 31 and a screw position sensor 32. The injection pressure sensor 31 detects an injection peak pressure during injection filling when the molten resin is injected and filled into the clamped mold 12. During injection filling, a screw located in the heating cylinder 13 moves forward. The screw position sensor 32 detects an injection foremost position of the screw during injection filling.

(Control Unit)

The injection molding machine 1 includes a control unit 33. The control unit 33 has the role of controlling the operation of the injection molding machine 1. The control unit 33 is connected with the mold clamping motor 15, the mold thickness motor 23, the mold position sensor 24, the mold thickness sensor 25, the mold gap detection sensor 26, the injection pressure sensor 31, and the screw position sensor 32.

In injection molding, the control unit 33 closes and opens the mold 12 by operating the mold clamping motor 15 on the basis of a signal from the mold position sensor 24. The control unit 33 is also configured to apply the set mold clamping force to the mold 12 for mold clamping by operating the mold thickness motor 23 on the basis of a signal from the mold thickness sensor 25.

In performing molding by injecting and filling a molten resin into the clamped mold 12, the injection molding machine 1 can implement a flash prevention method to be described below on the basis of signals (detection values) obtained from the mold gap detection sensor 26, the injection pressure sensor 31, and the screw position sensor 32. The purpose is to avoid an excessive mold clamping force and prevent the parting line of the mold 12 from opening so wide as to cause flash on the molded article.

(Flash Prevention Method)

As described above, if the injection filling pressure exceeds the mold clamping force applied to the mold during molding in an ordinary injection molding machine, there occurs a mold displacement and a gap appears at the parting line. This facilitates the occurrence of flash on the molded article. The present injection molding machine 1 then implements a method for preventing repetition of molding cycles where flash occurs during automatic operation, as well as a method for preventing an excessive mold clamping force and adjusting the mold clamping force so that the parting line of the mold will not open too wide.

(Amount of Mold Displacement)

The control unit 33 of the injection molding machine 1 has a preset threshold for the amount of mold displacement of the mold 12 during injection filling. The threshold for the amount of mold displacement is a maximum allowable value (allowable threshold) of the amount of mold displacement within a range where no flash occurs during molding. The threshold for the amount of mold displacement can be determined by the user of the injection molding machine 1 on the basis of empirical values.

The amount of mold displacement is detected by the mold gap detection sensor 26 during injection filling to the fully-clamped mold 12. The control unit 33 constantly monitors the amount of mold displacement of the mold 12 during injection filling by receiving the signal (detection value) from the mold gap detection sensor 26, and compares the detected amount of mold displacement with the threshold.

(Injection Peak Pressure)

The injection molding machine 1 has a preset injection filling pressure and a preset amount of filling for the mold 12. In injecting and filling a molten resin into the mold 12, the injection peak pressure is detected by the injection pressure sensor 31. If the injection filling pressure exceeds the set mold clamping force applied to the mold 12 and the mold displacement changes so much as to open the mold 12 at the parting line, the cavity (space to be filled with the molten resin) of the mold 12 increases. This reduces the injection peak pressure.

The control unit 33 has a preset threshold for the injection peak pressure during injection filling. The threshold for the injection peak pressure is a maximum allowable value (allowable amount) of the injection peak pressure within a range where no flash occurs (flash-free range). The peak pressure value to be set as the threshold for the injection peak pressure is determined by the user of the injection molding machine 1 on the basis of empirical values.

As described above, the control unit 33 receives the injection peak pressure as the detection value from the injection pressure sensor 31. The control unit 33 constantly monitors the injection peak pressure during injection filling, and compares the detected injection peak pressure value with the threshold for the injection peak pressure.

(Injection Foremost Position)

The injection molding machine 1 further detects the injection foremost position by the screw position sensor 32 when injecting and filling molten resin into the mold 12 at the preset injection filling pressure and the preset amount of filling as described above.

Suppose that the injection filling pressure exceeds the set mold clamping force applied to the mold 12 and a mold displacement changes so much as to open the mold 12 at the parting line, with an increase in the cavity size of the mold 12. In such a case, the injection foremost position of the screw moving in the heating cylinder 13 shifts forward (to the mold side) compared to when the cavity has a normal size, since an excessive molten resin is filled into the cavity.

The control unit 33 thus has a preset threshold for the injection foremost position during injection filling. The threshold for the injection foremost position is a maximum allowable value (allowable amount) of the injection foremost position within a range where no flash occurs (flash-free range). The value to be used as the threshold of the injection foremost position is determined by the user of the injection molding machine 1 on the basis of empirical values.

(Automatic Operation)

As described above, in a molding cycle, the injection molding machine 1 performs mold closing, mold clamping, injection filling of a molten resin, measurement, mold opening, and removal of the molded article in order. In the case of automatic operation, the control unit 33 operates to repeat the molding cycle so that molded articles are successively molded. The control unit 33 further operates so that a molding cycle including a mold clamping force automatic adjustment can be repeated during the automatic operation.

The flowchart of FIG. 4A includes a control flow A of the control unit 33 for repeating molding cycles during automatic operation. In the flowchart, "START AUTOMATIC OPERATION" represents the start of the control flow A.

(Step A1: Processing)

Suppose that the automatic operation of the injection molding machine 1 is selected to be started, and then a molding cycle is started. As the processing of step A1, the control unit 33 performs mold closing and mold clamping at the set mold clamping force, and after the completion of the mold clamping, makes the injection unit 3 start injection filling. Despite the representation "COMPLETE MOLD CLAMPING/START INJECTION" in the flowchart, the control unit 33 here controls processes up to the stage where pressure holding is completed and mold opening is ready.

(Step A2: Determination)

While the mold clamping unit 2 and the injection unit 3 are operating in the foregoing step A1, the control unit 33 receives the detection values detected by the mold gap detection sensor 26, the injection pressure sensor 31, and the screw position sensor 32. It will be understood that the control unit 33 also receives detection values and signals from other sensors and processes the detection values and the signals as information in performing control, a description thereof will be omitted. In step A2 subsequent to step A1, the control unit 33 makes a determination. The determination in step A2 relates to the amount of mold displacement, or the injection peak pressure and the injection foremost position, detected by the sensor(s).

In step A2, the control unit 33 compares the amount of mold displacement detected by the mold gap detection sensor 26 with the threshold for the amount of mold displacement, and determines whether the detected amount of mold displacement exceeds the threshold. Alternatively, the control unit 33 compares the injection peak pressure detected by the injection pressure sensor 31 with the threshold for the injection peak pressure, and compares the injection foremost position detected by the screw position sensor 32 with the threshold for the injection foremost position. The control unit 33 determines whether the detected injection peak pressure exceeds the threshold for the injection peak pressure and the detected injection foremost position exceeds the threshold for the injection foremost position.

(Step A2Y: Determination Content)

Step A2 is shown to branch depending on whether the determination is YES or NO. Step A2Y represents the content of the determination YES. Specifically, the content of the determination is that "the detected amount of mold displacement exceeds the threshold for the amount of mold displacement, and there is such a mold displacement change as to cause flash". Alternatively, the content of the determination that "the detected injection peak pressure exceeds the threshold for the injection peak pressure and the detected injection foremost position exceeds the threshold for the injection foremost position, and such an injection peak pressure anomaly and an injection foremost position anomaly as to cause flash have occurred".

(Step A2N: Determination Content)

Step A2N represents the content of the determination NO. The content of the determination NO is that "the detected amount of mold displacement does not exceed the threshold for the amount of mold displacement, and there is no such mold displacement change as to cause flash". Alternatively, the content of the determination is that "the detected injection peak pressure does not exceed the threshold for the injection peak pressure and the detected injection foremost position does not exceed the threshold for the injection foremost threshold, and no such injection peak voltage anomaly or injection foremost position anomaly as to cause flash has occurred".

(Step A3: Processing)

If the control flow goes through the foregoing determination step A2 and the determination-NO step A2N, the control unit 33 proceeds to step A3 where "mold opening" processing is performed. In step A3, the control unit 33 makes the mold clamping unit 2 perform mold opening. Before the determination step A4 shown subsequent to the mold opening step A3, the control unit 33 performs processing such as removal of the molded article. For easy understanding of the operation of the control unit 33, a description of such processing will be omitted.

(Step A4: Determination)

Step A4 is a step where a determination is made about a start of the mold clamping force automatic adjustment. In step A4, the control unit 33 determines whether a mold clamping force automatic adjustment start switch is on (SW-ON). The condition whether the mold clamping force automatic adjustment start switch is on or off is constantly transmitted to the control unit 33.

If the mold clamping force automatic adjustment start switch is determined to be off (determination is NO), the control flow returns to the processing of the foregoing step A1 (complete mold clamping/start injection). In other words, the control unit 33 proceeds to the control of the next molding cycle. The control flow in the case where the mold clamping force automatic adjustment switch is determined to be on (determination is YES) will be described later.

(Step A5: Processing)

In step A5 subsequent to the foregoing determination-YES step A2Y, the control unit 33 performs processing for determining that a situation where a mold displacement changes has occurred during injection filling.

(Step A6: Processing)

In step A6 subsequent to the foregoing step A5, the control unit 33 performs processing for determining that the molded article is affected and there is a conforming product determination anomaly.

(Stop Molding Machine)

After the processing for determining that the molded article is affected and there is a conforming product determination anomaly in the foregoing step A6, the control unit 33 stops the operation of the injection molding machine 1. The point in time when the operation of the injection molding machine 1 is stopped refers to an end of the "start automatic operation" control flow A of the control unit 33. The automatic operation control ends here. If "mold clamping force automatic adjustment" control is performed as will be described later and the control flow goes through steps A1, A2 (A2Y), A5, and A6 as a part of the "mold clamping force automatic adjustment" control, the "mold clamping force automatic adjustment" control also ends here.

(Mold Clamping Force Automatic Adjustment)

If the determination made in step A4 of the foregoing control flow A for automatic operation is YES, the control unit 33 performs a control flow B for mold clamping force automatic adjustment as shown in FIG. 4 (b). In the mold clamping force automatic adjustment, the set mold clamping force is gradually reduced, and the presence or absence of a mold displacement change of the mold 12 or the presence or absence of an injection peak pressure anomaly and an injection foremost position anomaly is determined. If there is a mold displacement change or if an injection peak pressure anomaly and an injection foremost position anomaly have occurred, the mold clamping force is increased.

FIG. 4 (b) shows the control flow B for mold clamping force automatic adjustment. In the flowchart, "START MOLD CLAMPING FORCE AUTOMATIC ADJUSTMENT" represents the start of the control flow B. The mold clamping force automatic adjustment control includes similar steps to some of those of the foregoing automatic operation control.

(Step B1: Processing)

If the mold clamping force automatic adjustment control is started, the control flow proceeds to step B1. The processing of step B1 is the same as that of step A1 for automatic operation.

(Step B2: Determination)

After the end of the processing in step B1, the control unit 33 enters the determination step B2. The determination of this step B2 is the same as that of the foregoing step A2. The contents of steps B2Y and B2N corresponding to the cases where the determination of step B2 is YES and NO, respectively, are also the same as those of steps A2Y and A2N.

(Step B3: Processing)

The processing of step B3 subsequent to step B2N is the same as that of the foregoing step A3. While the control unit 33 performs processing such as removal of the molded article before the next step, a description of the processing will be omitted for easy understanding of the operation of the control unit 33.

(Step B4: Determination)

Step B4 subsequent to the foregoing step B3 is a step for determining whether the number of repetitions associated with the molding through the foregoing step B3 should be used for counting the molding time as the number of repetitions. The number of repetitions at which the molding under the same set mold clamping force (same mold clamping pressure) can be repeated can be set into the control unit 33 as the set number of times in advance. If the number of repetitions associated with the molding through the foregoing step B3 is found to not coincide with the set number of times, it is determined that the associated number of repetitions should be continuously used for counting the molding time (adding one when addition control or subtracting one when subtraction control) (determination result: Y). Then, as shown in the flowchart, the control flow then returns to the processing of step B1. In such a case, mold clamping is performed under the same mold clamping force again in the next molding cycle.

On the other hand, if the number of repetitions associated with the molding through the foregoing step B3 coincides with (reaches) the set number of times, it is determined that the associated number of repetitions should not be continuously used for counting the molding time (determination result: N). In other words, the determination N means that the molding under the same set mold clamping force is performed the set number of times in succession, so that molding in the next molding cycle shall be performed with a reduction in the set mold clamping force.

(Step B5: Processing)

In step B5, the control unit 33 resets the number of repetitions of molding.

(Step B6: Processing)

In step B6 subsequent to step B5, the control unit 33 performs processing for reducing the mold clamping force by a constant amount and setting the reduced mold clamping force as the set mold clamping force. The control flow then returns to the processing of step B1. In such a case, the injection filling in the next molding cycle is performed with the mold 12 clamped by the reduced set mold clamping force.

(Step B7: Processing)

The control unit 33 performs "mold opening" processing of step B7 on the basis of the determination results in step B2Y. The processing of this step B7 is the same as that of the foregoing step B3.

(Step B8: Processing)

After the completion of the processing of the foregoing step B7, the control unit 33 performs "increase mold clamping force" processing of step B8. In this step B8, the control unit 33 performs processing for increasing the mold clamping force by a constant amount and setting the increased mold clamping force as the set mold clamping force. The control flow then returns to the processing of the foregoing step A1. In such a case, the injection filling in the next molding cycle is performed with the mold 12 clamped by the increased set mold clamping force.

In the mold clamping force automatic adjustment described above, if there occurs no mold displacement change to cause flash or there occurs no injection peak pressure anomaly or injection foremost position anomaly, the molding in the next molding cycle is performed again with the set mold clamping force set in the present molding cycle. If the molding cycle is repeated the set number of times without a mold displacement change or without an injection peak pressure anomaly or injection foremost position anomaly, the mold clamping force is reduced and molding is performed under the reduced set mold clamping force.

In the mold clamping force automatic adjustment, a mold displacement change may occur or an injection peak pressure anomaly and an injection foremost position anomaly may occur during molding under the foregoing set mold clamping force that is the reduced mold clamping force. In such a case, the mold clamping force is increased and molding is performed under the increased set mold clamping force. If a mold displacement change occurs or an injection peak pressure anomaly and an injection foremost position anomaly occur during the molding under the increased set mold clamping force, the control unit 33 stops the operation of the injection molding machine 1 as described above.

As described above, in the mold clamping force automatic adjustment, the control unit 33 monitors the mold displacement to cause flash, or the injection peak pressure and the injection foremost position, and adjusts the mold clamping force. An appropriate mold clamping force such that the mold 12 will not open too wide during injection filling can thereby be set with extremely high accuracy. This provides the injection molding machine 1 with the function of adjusting the mold clamping force relative to the injection filling pressure. Conforming molded articles can thus be successively molded with saved energy under such a set clamping force that the mold 12 will not open too wide, while suppressing the occurrence of flash.

The set mold clamping force is reduced in the processing of the foregoing step B6, and increased in the processing of the foregoing step B8. The amounts of reduction and increase in the respective steps B6 and B8 are set into the control unit 33 by the user of the injection molding machine 1 in advance. The amounts of reduction and increase do not necessarily need to be the same.

(Display Controller)

As shown in FIG. 1, the injection molding machine 1 includes a touch panel console 34 capable of inputting various types of setting information and the like. As shown in the drawings, a display controller 35 for displaying the detection values detected by the mold position sensor 24, the mold thickness sensor 25, and the mold gap detection sensor 26 on the console 34 in a waveform display or such other form is built in the control unit 33. The display controller 35 operates under the control of the control unit 33 and displays the detection values detected by the sensors on a display 34a of the console 34 in the set form.

In the present embodiment, the mold displacement detected by the mold gap detection sensor 26 is constantly displayed in the form of a waveform display under the control of the display controller 35. This provides the advantage that the user of the injection molding machine 1 can easily visually check the frequency of mold displacement changes exceeding the foregoing threshold.

(Monitoring Device and Mold Displacement Amount Maximum Value)

As described above, the user of the injection molding machine 1 sets the threshold for the mold displacement amount into the control unit 33. However, a mold displacement change exceeding the threshold for the mold displacement amount can sometimes occur during injection filling due to a failure of the mold 12. In such a case, the set mold clamping force is increased since the mold displacement change is detected. There causes a problem that the set mold clamping force is increased after each molding cycle unless the failure of the mold 12 is resolved.

To address the foregoing problem, a mold displacement amount maximum value is set as one of monitoring items in the control unit 33 that obtains the detection value detected by the mold gap detection sensor 26. The control unit 33 includes a built-in monitoring device 36 that receives the detection value detected by the mold gap detection sensor 26. This monitoring device 36 compares the amount of mold displacement detected by the mold gap detection sensor 26 with the mold displacement amount maximum value. If the amount of mold displacement reaches the mold displacement amount maximum value, the monitoring device 36 makes an output indicating the fact to the control unit 33.

Receiving the output indicating the fact that the amount of mold displacement reaches the mold displacement amount maximum value, the control unit 33 further performs processing for determining that a situation where a mold displacement changes during injection filling has occurred as described in the foregoing step A5. After the processing for determining that a situation where a mold displacement changes during injection filling has occurred in step A5, the control unit 33, in step A6, performs the processing for determining that the molded article is affected and there is a conforming product determination anomaly. The control unit 33 then stops the operation of the injection molding machine 1 as described above.

In such a manner, by the action of the monitoring device 36 receiving the detection value detected by the mold gap detection sensor 26, the control unit 33 can stop the operation of the injection molding machine 1 before the mold 12 breaks.

(Monitoring Device and Conforming Product Determination)

The monitoring device 36 built in the control unit 33 is described to receive the detection value detected by the mold gap detection sensor 26. However, the monitoring device 36 can receive detection values and signals from various sensors included in the injection molding machine 1, not just the mold gap detection sensor 26.

For example, the monitoring device 36 is configured to make a conforming product determination on the molded article based on a signal received from a predetermined sensor, and transmit the determination whether the molded article is a conforming product to the control unit 33 in the form of a signal. If the monitoring device 36 determines that the molded article is a defective product, the control unit 33 receiving the determination performs processing for determining that the molded article is affected and there is a conforming product determination anomaly in step A6. The control unit 33 then stops the operation of the injection molding machine 1.

In such a manner, by the action of the foregoing monitoring device 36, the control unit 33 can stop the operation of the injection molding machine 1 before defective molded articles continue to be produced.

REFERENCE SIGNS LIST

1 injection molding machine
2 mold clamping unit
3 injection unit
4 base
5 stationary platen
6 pressure-receiving platen
7 tie bar
8 movable platen
10 fixed mold
11 movable mold
12 mold
15 mold clamping motor
23 mold thickness motor
24 mold position sensor
25 mold thickness sensor
26 mold gap detection sensor
28 sensor holder
29 sensing plate
30 gap
31 injection pressure sensor
32 screw position sensor
33 control unit
34 console
35 display controller
36 monitoring device
A control flow for automatic operation by control unit
B control flow for mold clamping force automatic adjustment by control unit

What is claimed is:

1. A flash prevention method of an injection molding machine configured to close a mold and apply a mold clamping force thereto to perform mold clamping by a mold clamping unit and perform injection filling of a molten resin into the mold by an injection unit, the flash prevention method comprising:
    presetting an allowable amount where no flash occurs as a threshold for an amount of mold displacement of the mold, and presetting allowable amounts where no flash occurs as thresholds for an injection peak pressure and an injection foremost position;
    monitoring the amount of mold displacement and monitoring the injection peak pressure and the injection foremost position during automatic operation of repeating a molding cycle; and
    if a mold displacement change occurs or an injection peak pressure anomaly and an injection foremost position anomaly occur, stopping operation of the injection molding machine.

2. The flash prevention method according to claim 1, comprising a mold clamping force automatic adjustment step,
    the mold clamping force automatic adjustment step including:
        if a molding cycle where the mold displacement change does not occur or the injection peak pressure anomaly and the injection foremost position anomaly do not occur is performed a preset number of times in succession, reducing the mold clamping force by a preset amount of reduction and proceeding to a next molding cycle; and
        if the mold displacement change occurs or the injection peak pressure anomaly and the injection foremost position anomaly occur, increasing the mold clamping force by a preset amount of increase and proceeding to a next molding cycle.

3. The flash prevention method according to claim 2, wherein
    if the mold displacement change occurs or the injection peak pressure anomaly and the injection foremost position anomaly occur in the next molding cycle after the mold clamping force is increased by the preset amount of increase in the mold clamping force automatic adjustment step, the operation of the injection molding machine is stopped.

* * * * *